United States Patent [19]

Mehra et al.

[11] 4,394,266
[45] Jul. 19, 1983

[54] PRESSURE FILTER ADAPTER AND CONTAINMENT VESSEL

[75] Inventors: Ravinder C. Mehra, Fairport; Raj K. Aggarwal, Penfield, both of N.Y.

[73] Assignee: Sybron Corporation, Rochester, N.Y.

[21] Appl. No.: 321,435

[22] Filed: Nov. 16, 1981

[51] Int. Cl.³ .................................... B01D 35/14
[52] U.S. Cl. ................................ 210/244; 210/406
[58] Field of Search ............ 210/245, 244, 248, 406, 210/455, 472, 485

[56] References Cited

U.S. PATENT DOCUMENTS

| | | | |
|---|---|---|---|
| 1,601,502 | 9/1926 | Munro | 210/406 X |
| 2,055,096 | 9/1936 | Dehn et al. | 210/472 |
| 3,295,686 | 1/1967 | Krueger | 210/455 |
| 3,445,000 | 5/1969 | Litt | 210/406 |
| 3,726,795 | 4/1973 | Edwards | 210/406 |

Primary Examiner—John Adee
Attorney, Agent, or Firm—Robert A. Gerlach; Roger Aceto; Robert J. Bird

[57] ABSTRACT

Disclosed is a pressure adapter and containment vessel for converting a vacuum filter unit to use as a pressure filter. The containment vessel includes an off center well in the bottom of the vessel for supporting the filter unit, the off center well also providing a variable spacing between the wall of the containment vessel and the outlet spout of the filter unit. In addition, the containment vessel has a screw closure which cooperates with the cap of the filter unit to insure the filter unit is not pressurized until after the screw closure is properly attached to the containment vessel.

2 Claims, 2 Drawing Figures

PRESSURE FILTER ADAPTER AND CONTAINMENT VESSEL

BACKGROUND OF THE INVENTION

The present invention relates to a pressure filter adapter and containment vessel for vacuum filter units and the like.

Vacuum filter units are well known in the art and are especially useful in laboratory and analytical work. A typical vacuum filter is shown in U.S. Pat. No. 3,295,686. Briefly, such a unit includes an upper reservoir for the liquid to be filtered, a lower receptacle for receiving the filtrate and an intermediate filter means. These three components are joined to form an integral unit having a fluid tight seal between the outer margins of the filter means, reservoir and receptacle. In addition, the receptacle has a spout for attachment to a vacuum pump or the like. With this arrangement, the receptacle can be partly evacuated in order to facilitate the filtering process. When the evacuation means is disconnected, the spout serves the dual function of allowing the filtrate to be poured from the receptacle.

For some applications, pressure filtration is desired as opposed to vacuum filtration. For example, viscous liquids or liquids with a high particle load which may be difficult to filter using vacuum techniques are often filtered under pressure. Pressure filtration is also used to filter liquids containing dissolved gases such as carbon dioxide. Pressure filtration also eliminates foaming problems often encoutered with vacuum filtration.

To adapt the vacuum filter unit for use as a pressure filter, a cap is provided for the reservoir of the filter unit, the cap having a pressure line connector. In this way the volume of the reservoir over the liquid can be pressurized to force the liquid down through the filter means and into the receptacle.

Whenever a vacuum filter unit is used for pressure filtration, there are several safety procedures which should be observed. For example, the filter unit should be contained behind an appropriate shield. This protects against explosion and personal or property injury resulting from particles of the filter unit or from the liquids being filtered in the event such liquid contain corrosive materials or biological agents. Since the fluid being filtered under pressure is often viscous and relatively dense, it tends to make the filter unit top heavy when the liquid to be filtered is placed into the reservoir. For this reason, it is preferred that the filter unit be restrained or fixed in position so as to prevent tipping and spilling of the contents.

Each vacuum filter unit usually comes pre-sterilized and with a cotton plug inserted into the receptacle spout. This cotton plug prevents air borne bacteria or other organisms from entering into the receptacle and contaminating the filtrate. The plug is maintained in the spout during vacuum filtration and is removed only under sterile conditions prior to pouring the filtrate from the receptacle. During pressure filtration, it is possible for the pressure within the receptacle to push the plug out of the spout. Accordingly, care must be taken to insure that the cotton plug remains in position during pressure filtration.

The present invention allows the vacuum filter unit to be used as a pressure filter with relative safety and convenience by providing complete containment and support for the filter unit throughout the pressure filtration process.

SUMMARY OF THE INVENTION

The present invention may be characterized in one aspect thereof by the provision of a containment vessel comprising a hollow cylindrical body with a closed bottom and an open top. The bottom has a cylindrical well for receiving and supporting the filter unit. The well is located off center from the center of the bottom of the containment vessel so as to provide a variable spacing between the cylindrical wall of the containment vessel and the outlet of the filter unit spout. With this arrangement, the filter unit may be positioned so that the outlet of the spout is closely adjacent the wall of the containment vessel. A screw closure for the containment vessel also serves to maintain the reservoir cap in position so that the reservoir can be pressurized, the cap having a pressure connection which extends upwardly through a central opening in the containment vessel closure.

DESCRIPTION OF THE PREFERRED EMBODIMENTS

Figure 1:
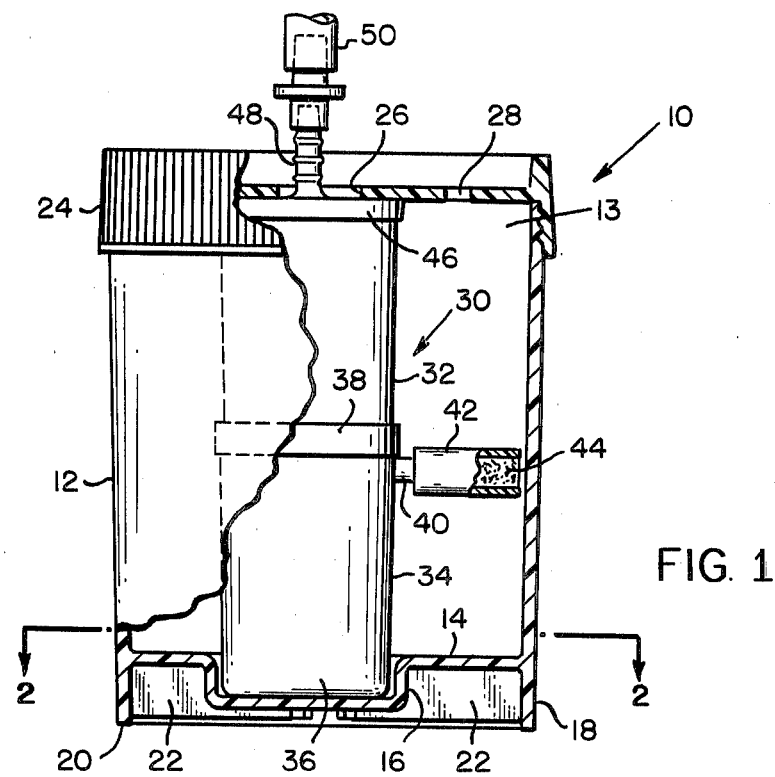
FIG. 1 is a side elevation view partly broken away and in section showing the containment vessel of the present invention containing a vacuum filter unit.

Referring to the drawings, FIG. 1 shows the pressure adapter and containment vessel of the present invention generally indicated at 10. The vessel may be made from any suitable material such as a clear, injection molded polycarbonate. The vessel is generally a cylinder having a cylindrical wall 12, an open top 13 and a closed bottom 14. The bottom 14 is formed with a cylindrical well 16 located off center from the center of the bottom for purposes set out hereinbelow.

Wall 12 has a lower portion 18 which extends downwardly from the plane of bottom 14 to a point below the plane of the bottom of well 16. With this arrangement the lower edge 20 of this wall portion is the supporting edge for the containment vessel.

Extending between the outer periphery of well 16 and the inner periphery of the lower wall portion 20 are a plurality of radially extending ribs 22. These ribs provide support for, and strengthen, the bottom of the containment vessel.

The open top 13 of the pressure and containment vessel is provided with a screw closure 24. This closure has a centrally located opening 26 and at least one laterally spaced vent opening 28, the vent opening being smaller in diameter than central opening 26.

Disposed within the pressure adapter and containment vessel 10 is a vacuum filter unit generally indicated at 30. This unit may be any one of several types but is preferred to be generally similar in construction to that filter unit shown in U.S. Pat. No. 3,295,686. Generally, such a unit includes an upper open ended reservoir 32 for receiving the liquid to be filtered and a lower receptacle 34 for receiving the filtrate. The base 36 of the receptacle has a diameter sufficient to permit its reception into well 16 as shown in FIG. 1.

Intermediate the reservoir and receptacle as indicated at 38 is a filter means, the outer periphery of the filter means being in fluid tight engagement with the reservoir and receptacle so that fluid can only pass through the filter means in order to enter receptacle 34.

Extending outward from the receptacle and below the filter means is a spout 40. As is customary, this spout carries a connector 42 which is stuffed with a removable cotton plug 44.

The open upper end of reservoir 32 is closed by a snap-on cap member 46, this cap having a upstanding connector 48 for attachment to a pressure line 50.

It is preferred that the height of the containment vessel, as measured from the bottom of well 16 to the plane of the open top 13, be slightly less than the height of the filter unit 30. With this arrangement, the screw closure 24 will act to firmly seat cup 46 to the filter unit and retain the filter unit within the containment vessel. The screw closure 24 also will provide a safety feature as set out hereinbelow.

In operation, the liquid to be filtered is first placed into the reservoir 32. Cap 46 is then positioned over the open end of the reservoir and the entire filter unit 30 inserted into the containment vessel 10. It should be appreciated that the liquid within reservoir 32 renders the filter unit slightly top heavey. Accordingly, locating base 36 of the filter unit in well 16 acts to stabilize and support the filter unit so that it does not tip.

Figure 2:
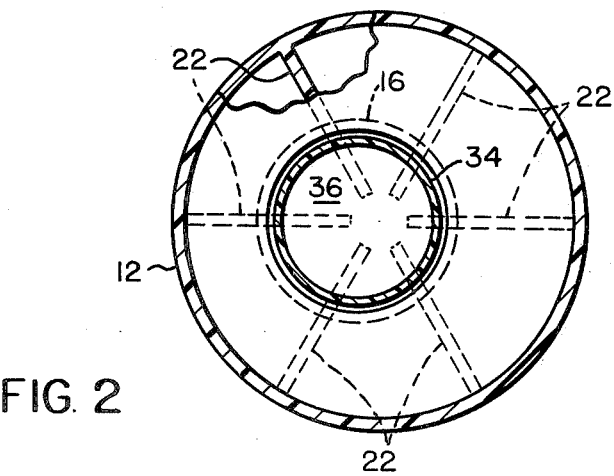
FIG. 2 is a view taken along lines 2—2 of FIG. 1.

Since well 16 is off center from the center of the bottom 14 of the pressure adapter, it should be appreciated that the spacing between the wall 12 of the containment vessel and the wall of filter unit varies from a minimum at one side of the well to a maximum at an opposite side. This is best seen in FIG. 2. When the filter unit is first inserted into the containment vessel, it is oriented so that the outlet of spout 40 is positioned the greatest distance from wall 12. This facilitates the insertion and removal of the filter unit from the containment vessel.

After the filter unit is positioned in well 16, it is then rotated until the outlet of spout 40 is butted up against the wall of the containment vessel as shown in FIG. 1. With this arrangement, the wall of the containment vessel acts as a stop means to prevent cotton plug 44 from being pushed out of connector 42 when the interior of the filter unit pressurized. Since the spacing between the wall of containment vessel 12 and the wall of the filter unit is variable, the arrangement as described herein will accommodate filter units of various diameters or having spouts 40 of various lengths.

After the filter unit is in the proper orientation with the outlet of spout 40 butted against wall 12, screw closure 24 is put into position and threaded to the wall to close the containment vessel. As closure 24 is threaded into position, it bears against cap 46 and forces the cap into a fluid tight engagement with reservoir 32. A pressure hose is then connected to pressure connector 48 and the filter unit pressurized.

Since the pressure line cannot be connected to connector 48 until after closure 24 is in position, the closure acts as a safety feature in that the filter unit cannot be pressurized without the closure in place. In this respect, the closure, which bears against cap 46, holds the cap in position and prevents the cap from being lifted from reservoir 32 upon pressurization of the reservoir. Accordingly, if an attempt is made to pressurize reservoir 32 without the closure in position, cap 46 will separate from the reservoir to prevent such pressurization.

Should any failure of the filter unit occur while it is being pressurized, vessel 10 will act to contain any liquids that might be expressed or leak from the failed vessel. Vent 28 in the closure is sufficient to relieve pressure within the containment vessel so that it does not fail should the filter unit fail. Thus, it should be appreciated that the pressure adapter and containment vessel of the present invention provides a simple easily operated means for safely converting a vacuum filter unit to use as a pressure filter. The containment vessel supports the filter unit to prevent tipping when it is top heavy, provides a simple means for insuring that the cotton plug remains within the spout of the filter unit and incorporates a safety feature insuring that the containment vessel is completely closed and sealed before the filter unit can be pressurized.

Having thus described the invention in detail, what is claimed as new is:

1. A containment vessel for receiving a vacuum filter unit comprising:
   (a) a hollow cylindrical body having a closed bottom portion, a cylindrical side wall upstanding from said bottom portion, and an open top;
   (b) said bottom portion including a raised floor defining a cylindrical well extending below the plane of said floor for accommodating the base of the filter unit, said well being located off center relative to said bottom providing a varying radial clearance between said filter unit and said sidewall around their respective circumferences; and
   (c) a screw closure for said open top, said closure having a first central opening through which to communicate with said filter unit and a second vent opening radially spaced from said central opening.

2. A filter unit and containment vessel for use in pressure filtration comprising, in combination:
   (a) a filter unit of the type having:
      (i) an upper, open ended reservoir for receiving the liquid to be filtered,
      (ii) a cap for the open upper end of said reservoir, said cap having an upstanding, centrally located pressure connector,
      (iii) a lower receptacle for receiving the filtrate, said receptacle having at least one outwardly extending spout and a removable plug in said spout,
      (iv) filter means intermediate said reservoir and receptacle including means for providing a fluid tight seal between the peripheries of said reservoir, filter means and receptacle;
   (b) a cylindrical containment vessel for receiving said vacuum filter unit, said vessel including a closed bottom, a cylindrical side wall and an open top;
   (c) said bottom having a well therein extending below the plane of said bottom for accommodating the base of said receptacle, the distance from the plane of the bottom of said well to said open top being less than the height of said filter unit, the center of said well being located off center from the center of said bottom to provide a space between said well and said side wall which gradually varies from a minimum at one side of said well to a maximum at an opposite side of said well, the spacing between said well and side wall being sufficient to permit the orientation of said filter unit in said well so as to locate the outlet of said spout adjacent said side wall, whereby said side wall functions as a means to retain said plug in said spout, and
   (d) a closure for said open top, said closure having a central opening to permit the passage of said pressure connector out of said containment vessel.

* * * * *